United States Patent Office 2,750,355
Patented June 12, 1956

2,750,355

METHOD OF PREPARING MELAMINE-FORMALDEHYDE RESINS, INCLUDING VACUUM DEHYDRATION

Howard Patrick Ledden, Old Greenwich, Conn., assignor to American Cyanamid Company, New York, N. Y., a corporation of Maine No Drawing. Application May 2, 1951,
Serial No. 224,249

8 Claims. (Cl. 260—67.6)

This invention relates to fast curing, thermosetting resin compositions and, more particularly, to fast curing thermosetting resin compositions capable of producing, on molding, clear molded articles. More particularly, this invention relates to a fast curing resin composition comprising a mixture of (1) a melamine-formaldehyde resin having a mol ratio of melamine to formaldehyde between about 1:1.5 and 1:2.5, and (2) a mixture of a volatile alkyl alkylol tertiary amine and an acid having a dissociation constant greater than $1.0 \times 10^{-5}$.

One of the objects of the present invention is to produce a fast curing, thermosetting resin composition. A still further object of the present invention is to produce a fast curing, thermosetting resin composition which is capable of producing, on molding, clear molded articles.

A still further object of the present invention is to produce a fast curing, thermosetting resin composition comprising a mixture of (1) a melamine-formaldehyde resin and (2) a mixture of a volatile alkyl alkylol tertiary amine and a compatible acidic material having a dissociation constant greater than $1.0 \times 10^{-5}$.

A still further object of the present invention is to produce a resin composition of the type described which will not set at 120° C. in less than 5 minutes but which will set in 1–2 minutes at 150° C.

These and other objects of the present invention will be discussed more fully hereinbelow.

In the prior art, it has been suggested that amines of various types may be used to modify amino triazinealdehyde products but the use of primary and secondary amines are not useful for the accomplishment of the objects of the present invention because of their marked inclination to react with the aldehydes to form amine modified amino triazine aldehyde condensation products. Even alkyl tertiary amines have been suggested in the prior art but these are not desirable and cannot be used to produce the results which I have discovered because the higher alkyl tertiary amines will not buffer the system adequately and the lower alkyl tertiary amines will boil off during the drying step and will, as a consequence, have no effect on the condensation product. Even the trialkylol tertiary amines have been suggested as modifiers of amino triazine resins but in the use of these trialkylol tertiary amines, it is found that before one can produce anything approaching the desired result, one is obligated to incorporate such a substantial amount of said amine into the resin that the resultant resin composition is modified very markedly and the final molded product is undesirable.

The process of the present invention can be accomplished in a manner comparable to the examples set forth hereinbelow in which all parts are parts by weight. These examples are set forth solely for the purpose of illustration and specific enumeration of details should not be interpreted as limitations on the case except as indicated by the appended claims.

Example 1

126 parts of melamine (1 mol) and 162 parts of a 37% aqueous formaldehyde solution are introduced into a suitable reaction chamber equipped with thermometer, stirrer and reflux condenser and heat reacted to a low degree of condensation, i. e. until 2 drops of the syrup produces a permanent cloud in 30 cc. of $H_2O$ at 25° C. The condensation product thus produced is adjusted to a pH of 10 and then is dehydrated with mechanical agitation under a vacuum of 52 centimeters by applying heat until the resin temperature is 75–95° C. Thereupon 2.4 parts of a mixture of 0.8 part of acetic acid and 1.6 parts of diethyl ethanol amine having a pH of about 8.2 to 8.5 is added for each 100 parts of the melamine-formaldehyde reaction product. The resin and acid-amine mixture is thoroughly agitated to disperse completely the amine-acid mixture in the melamine-formaldehyde reaction product. The resinous composition is removed and then tray dried in at least two drying steps to molding plasticity by heating at temperatures decreasing from about 90° C. to about 60° C. Before the final stages of the drying, the resinous composition is reduced to a comminuted state. The resultant composition was fast curing and produced clear, transparent articles on molding.

Example 2

Example 1 was repeated except that a mixture of 0.4 part of acetic acid and 0.8 part of diethyl ethanol amine having a pH of about 8.2 to 8.5 were added to the dehydrated melamine-formaldehyde reaction product per 100 parts of said reaction product. The addition of the acid-amine mixture to the resinous reaction product was accomplished after the vacuum concentration had been carried to a resin temperature of 87° C. The resultant resinous composition cured in 1½ to 2 minutes at 150° C. to produce molded discs of optimum clarity.

In the practice of the process of the present invention, it is desired to use an alkyl alkylol tertiary amine having a molecular weight less than 140. Amongst those tertiary amines which may be used are dimethyl methanol amine, dimethyl ethanol amine, dimethyl propanol amine, dimethyl butanol amine, dimethyl pentanol amine, diethyl methanol amine, diethyl ethanol amine, diethyl propanol amine, dipropyl methanol amine, methyl dimethanol amine, methyl diethanol amine, ethyl dimethanol amine, ethyl diethanol amine, propyl dimethanol amine, butyl dimethanol amine, and the like. Additionally, one may use tertiary amines of the type described in which the alkyl or alkylol groups are of a substituted type such as wherein one or more of the hydrogens on the carbon atoms is substituted by a halo group such as chloro, bromo or by a nitro group and the like provided that these groups are not aldehyde reactable. Still further, these alkyl and alkylol groups, whenever possible, may be other than normal such as isopropyl, tertiary butyl and the like. Obviously, mixtures of the amines may be used.

Any acid having a dissociation constant greater than $1.0 \times 10^{-5}$ may be used in combination with the alkyl alkylol tertiary amine provided that it is compatible with said amine and with the melamine resin. Amongst those acids which have been found to be suitable are acetic acid, hydrochloric acid, sulfuric acid, phosphoric acid, benzoic acid, lactic, propionic, and the like. Additionally, it is possible to use many other acids of the type described provided they have the dissociation constant greater than $1.0 \times 10^{-5}$ such as halo substituted acids, e. g. chloro acetic acid, chloro propionic acid but if color of the molded article is of prime importance, these halo substituted acids should be avoided as they will tend to impart a yellowish coloration to the molded article. Obviously, mixtures of acids may be used.

The ratio of the acidic material to the tertiary amine may be varied over a fairly substantial range such as 1:0.5 to 1:20 parts by weight of acid to amine, respectively, and preferably weight ratios of 1:2 to 1:10 acid to amine, respectively. The weight ratio of the resin to the acid-amine mixture should be between 1:0.001 and 1:0.05, respectively, and preferably between 1:0.008 and 1:0.025, respectively. It will be obvious to anyone skilled in the art that in the selection of a particular amine to be used in combination with a particular acid, one should take into consideration the alkaline or buffering effect of the amine and the strength of the acid. If one were to select an amine with a strong alkaline characteristic and an acid which is comparatively weak, one would need a greater proportion of the acid than one would need if one were to select a strong acid with such an amine. Similarly, if one were to select an amine which had a weak alkaline characteristic and were to combine it with a strong acid, one would need less of the acid material than that amount required when a weaker acid is selected. The amount of mixture of a strong acid and a strong amine which one would use with the resin would be inclined toward the minimum amount stated hereinabove in the weight ratios of the resin to the acid-amine mixture whereas if one were to select a mixture of a comparatively weak amine and a comparatively weak acid, the amount used with the resin would be inclined toward the upper limit of the weight ratios of the resin to the acid-amine mixture stated hereinabove. Obviously, mixtures of amines of moderate alkalinity with acids of moderate acidic strength would fit in some intermediate position.

The pH of the resin before the acid-amine mixture must be controlled at a pH of at least 7 and preferably at a pH value between 7.0 and 10. The pH of the resin acid-amine mixture should be between 7 and 10.

In the preparation of the resinous compositions of the present invention, it is desired that the composition will have a comparatively long set time (at least 5 minutes) at 120° C. but a comparatively short set time (1–2 minutes) at 150° C., the temperature at which the composition may be cured. The purpose for this prerequisite characteristic of the composition resides in the fact that, if a set time shorter than 5 minutes at 120° C. is a characteristic of the composition the resin will set up in the kettle in the course of preparation before one is enabled to remove it therefrom for the tray-drying step. The temperatures referred to immediately hereinabove refer to temperatures at normal atmospheric conditions.

In the preparation of the melamine-formaldehyde condensation product prior to the addition of the acid amine mixture, one can use melamine and formaldehyde in mol ratios of 1:1.5 to 1:2.5, respectively, and preferably 1:2, respectively. During the dehydration step, an absolute vacuum of at least 52 cm. must be used. Concentration at 59 cm. resulted in the final resin temperature reaching 89° C. with a removal of 33.4% of the water. The final resin temperature during the dehydration step can be varied between 75 and 95° C. The preferred final temperature during dehydration is 87–89° C. When the minimum vacuum is used, namely 52 cm., concentration can be continued until a temperature not higher than 95° C. is reached before adding the acid-amine mixture without experiencing an uncontrollable exotherm in the kettle.

The final drying step, that in which the resin, acid-amine mixture is dried to molding plasticity can be accomplished in a plurality of ways such as tray drying, spray drying and the like, but it is preferred that tray drying be used. This tray drying step can be continued until the flow-mold-flow value is between 0.02 and 0.06 inch and preferably between 0.03 and 0.05 inch. At least the final portion of the tray drying operation should be accomplished while the resin is in a finely comminuted state such as those resins which have been ground in a mortar or micro-pulverizer to a particle size sufficient to pass through a 40 mesh screen or greater such as through a 100 mesh screen.

At the same time, the resin should be tray-dried to the point where the condensation product has a plasticity of about 0.02 to 0.06 inch as determined by the following test:

A charge of fifty grams of the material at 20°–30° C. is placed in the center of the bottom platen of a molding press, both platens of which are at a temperature of 290±2° F. and which are so shaped and grooved as to produce a flat molded disc with concentric ridges ½" apart. The press is closed in 20 seconds and a force of 18 tons applied in 15 seconds and maintained during the cure time. At the end of the time required for cure, the piece is removed and cooled. The average measurement of the thickness taken in the ring about 2¼ inches from the center of the molded disc is recorded in mils or inches as a measure of the plasticity. For convenience, this testing of the plasticity or flow of the resin will be referred to as the "flow-mold-flow test."

I claim:

1. A process for preparing a fast curing thermosetting resin composition, capable of producing clear molded articles, comprising reacting melamine and formaldehyde in a mol ratio of 1:1.5 to 1:2.5, respectively, to form a condensation product, dehydrating the reaction product by heating under a vacuum of at least 52 centimeters until the resin temperature is between about 75–95° C. thereafter adding a mixture of an acid having a dissociation constant greater than $1.0 \times 10^{-5}$ and a compound selected from the group consisting of alkyl alkylol tertiary amines and substituted alkyl alkylol tertiary amines wherein the substituted substituent is selected from the group consisting of chloro, bromo and nitro radicals having a molecular weight less than 140 and drying the mixture to molding plasticity wherein at least the final part of said drying is accomplished in a comminuted state, wherein the weight ratio of said resin to said acid-amine mixture is 1:0.001 to 1:0.05, respectively, and wherein the weight ratio of said acid to said amine is 1:0.5 to 1:20, respectively.

2. A process for preparing a fast curing thermosetting resin composition, capable of producing clear molded articles, comprising reacting melamine and formaldehyde in a mol ratio of 1:1.5 to 1:2.5, respectively, to form a condensation product, dehydrating the reaction product by heating under a vacuum of at least 52 centimeters until the resin temperature is between about 75–95° C. thereafter adding a mixture of an acid having a dissociation constant greater than $1.0 \times 10^{-5}$ and a compound selected from the group consisting of alkyl alkylol tertiary amines and substituted alkyl alkylol tertiary amines wherein the substituted substituent is selected from the group consisting of chloro, bromo and nitro radicals having a molecular weight less than 140 and drying the mixture to molding plasticity wherein at least the final part of said drying is accomplished in a comminuted state, wherein the weight ratio of said resin to said acid-amine mixture is 1:0.008 to 1:0.025, respectively, and wherein the weight ratio of said acid to said amine is 1:0.5 to 1:20, respectively.

3. A process for preparing a fast curing thermosetting resin composition, capable of producing clear molded articles, comprising reacting melamine and formaldehyde in a mol ratio of 1:1.5 to 1:2.5, respectively, to form a condensation product, dehydrating the reaction product by heating under a vacuum of at least 52 centimeters until the resin temperature is between about 75–95° C., thereafter adding a mixture of acetic acid and diethyl ethanol amine and drying the mixture to molding plasticity wherein at least the final part of said drying is accomplished in a comminuted state, wherein the weight ratio of said resin to said acid-amine mixture is 1:0.008 to 1:0.025, respectively, and wherein the weight ratio of said acid to said amine is 1:0.5 to 1:20, respectively.

4. A process for preparing a fast curing thermosetting resin composition, capable of producing clear molded articles, comprising reacting melamine and formaldehyde in a mol ratio of 1:1.5 to 1:2.5, respectively, to form a condensation product, dehydrating the reaction product by heating under a vacuum of at least 52 centimeters until the resin temperature is between about 75–95° C., thereafter adding a mixture of hydrochloric acid and a compound selected from the group consisting of alkyl alkylol tertiary amines and substituted alkyl alkylol tertiary amines wherein the substituted substituent is selected from the group consisting of chloro, bromo and nitro radicals having a molecular weight less than 140 and drying the mixture to molding plasticity wherein at least the final part of said drying is accomplished in a comminuted state, wherein the weight ratio of said resin to said acid-amine mixture is 1:0.001 to 1:0.05, respectively, and wherein the weight ratio of said acid to said amine is 1:0.5 to 1:20, respectively.

5. A process for preparing a fast curing thermosetting resin composition, capable of producing clear molded articles, comprising reacting melamine and formaldehyde in a mol ratio of 1:1.5 to 1:2.5, respectively, to form a condensation product, dehydrating the reaction product by heating under a vacuum of at least 52 centimeters until the resin temperature is between about 75–95° C., thereafter adding a mixture of sulfuric acid and a compound selected from the group consisting of alkyl alkylol tertiary amines and substituted alkyl alkylol tertiary amines wherein the substituted substituent is selected from the group consisting of chloro, bromo and nitro radicals having a molecular weight less than 140 and drying the mixture to molding plasticity wherein at least the final part of said drying is accomplished in a comminuted state, wherein the weight ratio of said resin to said acid-amine mixture is 1:0.001 to 1:0.05, respectively, and wherein the weight ratio of said acid to said amine is 1:0.5 to 1:20, respectively.

6. A process for preparing a fast curing thermosetting resin composition, capable of producing clear, molded articles, comprising reacting melamine and formaldehyde in a mol ratio of 1:1.5 to 1:2.5, respectively, to form a condensation product, dehydrating the reaction product by heating under a vacuum of at least 52 centimeters until the resin temperature is between about 75–95° C., thereafter adding a mixture of acetic acid and a compound selected from the group consisting of alkyl alkylol tertiary amines and substituted alkyl alkylol tertiary amines wherein the substituted substituent is selected from the group consisting of chloro, bromo and nitro radicals having a molecular weight less than 140 and drying the mixture to molding plasticity wherein at least the final part of said drying is accomplished in a comminuted state, wherein the weight ratio of said resin to said acid-amine mixture is 1:0.001 to 1:0.05, respectively, and wherein the weight ratio of said acid to said amine is 1:0.5 to 1:20, respectively.

7. A process for preparing a fast curing thermosetting resin composition, capable of producing clear, molded articles, comprising reacting melamine and formaldehyde in a mol ratio of 1:1.5 to 1:2.5, respectively, to form a condensation product, dehydrating the reaction product by heating under a vacuum of at least 52 centimeters until the resin temperature is between about 75–95° C., thereafter adding a mixture of an acid having a dissociation constant greater than $1.0 \times 10^{-5}$ and diethyl ethanol amine and drying the mixture to molding plasticity wherein at least the final part of said drying is accomplished in a comminuted state, wherein the weight ratio of said resin to said acid-amine mixture is 1:0.008 to 1:0.025, respectively, and wherein the weight ratio of said acid to said amine is 1:0.5 to 1:20, respectively.

8. A process for preparing a fast curing thermosetting resin composition, capable of producing clear, molded articles, comprising reacting melamine and formaldehyde in a mol ratio of 1:1.5 to 1:2.5, respectively, to form a condensation product, dehydrating the reaction product by heating under a vacuum of at least 52 centimeters until the resin temperature is between about 75–95° C., thereafter adding a mixture of an acid having a dissociation constant greater than $1.0 \times 10^{-5}$ and methyl diethanol amine and drying the mixture to molding plasticity wherein at least the final part of said drying is accomplished in a comminuted state, wherein the weight ratio of said resin to said acid-amine mixture is 1:0.008 to 1:0.025, respectively, and wherein the weight ratio of said acid to said amine is 1:0.5 to 1:20, respectively.

References Cited in the file of this patent

UNITED STATES PATENTS

| | | |
|---|---|---|
| 2,291,379 | D'Alelio | July 28, 1942 |
| 2,326,727 | Schroy | Aug. 10, 1943 |
| 2,385,383 | Schroy | Sept. 25, 1945 |
| 2,388,143 | Harris | Oct. 30, 1945 |